US012586572B2

(12) United States Patent
Darla et al.

(10) Patent No.: US 12,586,572 B2
(45) Date of Patent: Mar. 24, 2026

(54) SYSTEMS AND METHODS FOR INTENT PREDICTION AND USAGE

(71) Applicant: JPMORGAN CHASE BANK, N.A., New York, NY (US)

(72) Inventors: Sai Chaitanya Darla, McKinney, TX (US); Owen Churchill, Columbus, OH (US); Vlad Tyshkevich, Brooklyn, NY (US); Oluwaseye Adekanye, Middletown, DE (US); Jose Burgos, Dallas, TX (US); Siva Tanuku, Westerville, OH (US); Rudolph L. Mappus, IV, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 373 days.

(21) Appl. No.: 18/318,094

(22) Filed: May 16, 2023

(65) Prior Publication Data

US 2024/0386883 A1 Nov. 21, 2024

(51) Int. Cl.
*G10L 15/18* (2013.01)
*G06N 3/0464* (2023.01)
*G06N 3/09* (2023.01)
*G10L 15/06* (2013.01)
*G10L 15/16* (2006.01)
*G10L 15/22* (2006.01)

(52) U.S. Cl.
CPC ........ *G10L 15/1815* (2013.01); *G06N 3/0464* (2023.01); *G06N 3/09* (2023.01); *G10L 15/063* (2013.01); *G10L 15/22* (2013.01); *G10L 15/16* (2013.01)

(58) Field of Classification Search
CPC ... G10L 15/1815; G10L 15/063; G10L 15/22; G10L 15/16; G06N 3/09; G06N 3/0464
See application file for complete search history.

(56) References Cited

U.S. PATENT DOCUMENTS

| | | | | |
|---|---|---|---|---|
| 9,223,851 | B2 * | 12/2015 | Zarzar Charur | .... G06F 16/3322 |
| 9,373,322 | B2 * | 6/2016 | Goussard | ................ G06F 40/20 |
| 10,446,147 | B1 * | 10/2019 | Moniz | .................... G06F 40/205 |
| 11,423,897 | B1 * | 8/2022 | Levy | ....................... G06F 40/56 |
| 2019/0179890 | A1 * | 6/2019 | Evermann | ............... G06F 40/35 |
| 2019/0362710 | A1 * | 11/2019 | Yannam | ................. G06Q 10/10 |
| 2020/0349228 | A1 * | 11/2020 | Bharara | .............. G10L 15/1822 |

(Continued)

OTHER PUBLICATIONS

International Search Report and Written Opinion of the International Searching Authority, dated Jul. 16, 2024, from corresponding International Application No. PCT/US2024/028007.

(Continued)

*Primary Examiner* — Mohammad K Islam

(74) *Attorney, Agent, or Firm* — GREENBERG TRAURIG LLP

(57) ABSTRACT

In some aspects, the techniques described herein relate to a method including: tokenizing a text string into utterance tokens; vectorizing the utterance tokens; providing the utterance tokens to a machine learning model as input to the machine learning model; receiving, as output from the machine learning model, a predicted intent; formatting a query of a content repository, wherein the query includes the predicted intent; receiving, based on the query, an artifact from the content repository; and displaying the artifact via an interface.

8 Claims, 3 Drawing Sheets

(56)     References Cited

U.S. PATENT DOCUMENTS

| | | |
|---|---|---|
| 2021/0004819 A1 | 1/2021 | Adibi et al. |
| 2021/0006656 A1 | 1/2021 | Gramacho et al. |
| 2023/0045930 A1 | 2/2023 | Can et al. |
| 2023/0102179 A1 | 3/2023 | Elango et al. |

OTHER PUBLICATIONS

Schuurmans, Jetze; et al.: "Intent Classification for Dialogue Utterances", IEEE Intelligent Systems, IEEE, USA, vol. 35, No. 1, Nov. 21, 2019 (Nov. 21, 2019), pp. 82-88.
Ullas, Nambiar; et al.: "Helping satisfy multiple objectives during a service desk conversation", SIGMOD'08, ACM, ACM, Vancouver, BC, Canada, Jun. 9, 2008 (Jun. 9, 2008), pp. 1147-1158.

* cited by examiner

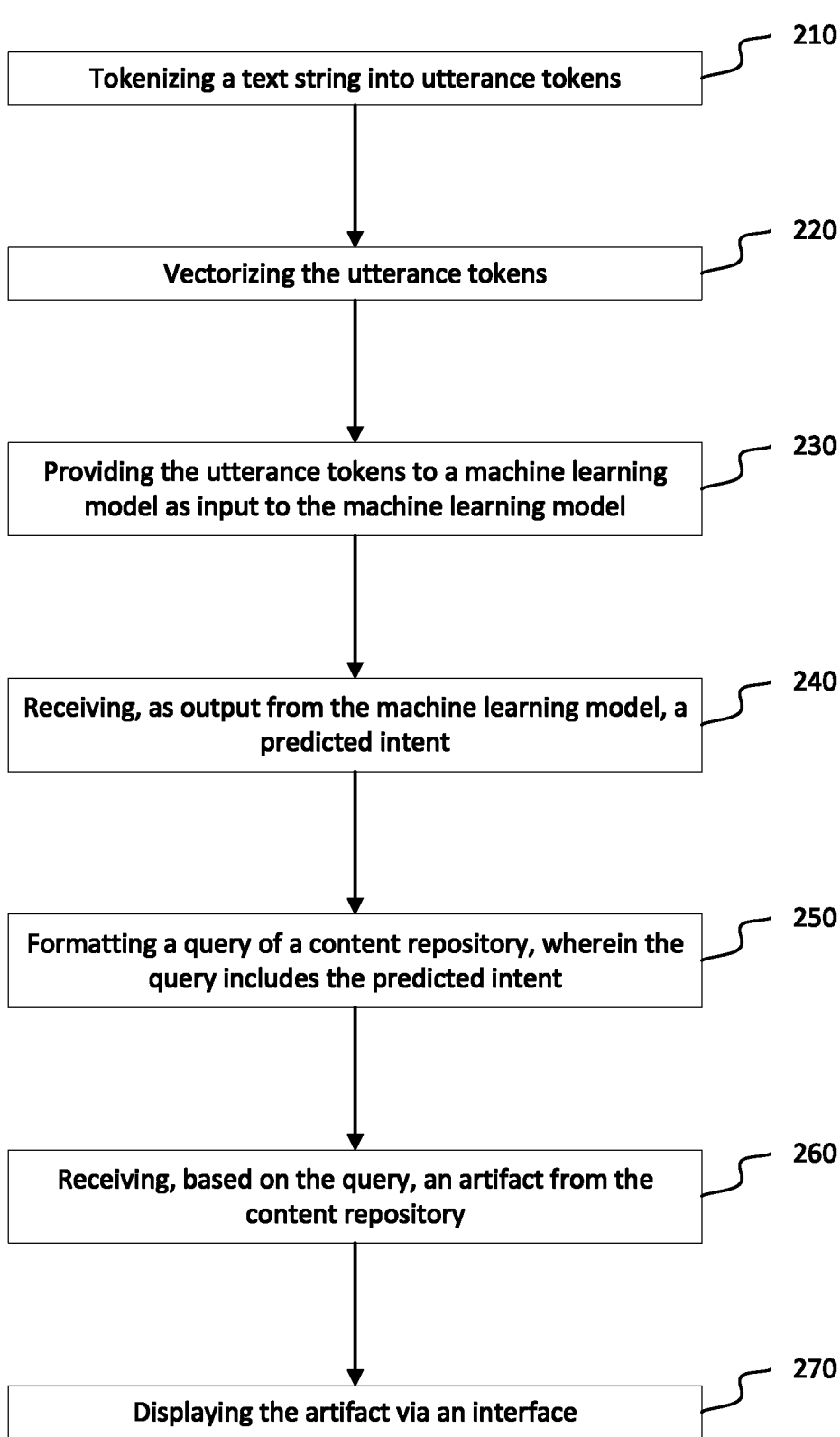

Tokenizing a text string into utterance tokens — 210

Vectorizing the utterance tokens — 220

Providing the utterance tokens to a machine learning model as input to the machine learning model — 230

Receiving, as output from the machine learning model, a predicted intent — 240

Formatting a query of a content repository, wherein the query includes the predicted intent — 250

Receiving, based on the query, an artifact from the content repository — 260

Displaying the artifact via an interface — 270

FIGURE 2

SYSTEMS AND METHODS FOR INTENT PREDICTION AND USAGE

BACKGROUND

1. Field of the Invention

Aspects generally relate to systems and methods for intent prediction and usage.

2. Description of the Related Art

Customer calls and other contacts with a customer contact management center represent opportunities for an organization to serve customers. If left unattended to, residual customer issues can lead to repeat customer calls/contacts with a contact center. Repeat calls may diminished customer experience and add costs to a customer support process. Because of the voice-only interaction of phone support, however, it can be challenging for agents to ascertain when all of a customer's concerns have been addressed during an interaction. Determining a customer's intents when a contact is made and presenting relevant customer information and support solutions to a support specialist at crucial times, such as immediately prior to and during an interaction, presents technical challenges.

SUMMARY

In some aspects, the techniques described herein relate to a method for intent prediction and usage including: tokenizing a text string into utterance tokens; vectorizing the utterance tokens; providing the utterance tokens to a machine learning model as input to the machine learning model; receiving, as output from the machine learning model, a predicted intent; formatting a query of a content repository, wherein the query includes the predicted intent; receiving, based on the query, an artifact from the content repository; and displaying the artifact via an interface.

In some aspects, the techniques described herein relate to a method, wherein the artifact is indexed in the content repository by the predicted intent.

In some aspects, the techniques described herein relate to a method, wherein the artifact is a knowledge base article.

In some aspects, the techniques described herein relate to a method, including: receiving a voice-based contact; and converting the voice-based contact into the text string using a speech-to-text engine.

In some aspects, the techniques described herein relate to a method, wherein the text string is received as a text-based contact.

In some aspects, the techniques described herein relate to a method, including: generating mapped utterance tokens, wherein the generating mapped utterance tokens includes: mapping previously recorded utterance tokens to predefined intent category labels.

In some aspects, the techniques described herein relate to a method, including: training the machine learning model with the mapped utterance tokens.

In some aspects, the techniques described herein relate to a system including at least one computer including a processor, wherein the at least one computer is configured to: tokenize a text string into utterance tokens; vectorize the utterance tokens; provide the utterance tokens to a machine learning model as input to the machine learning model; receive, as output from the machine learning model, a predicted intent; format a query of a content repository, wherein the query includes the predicted intent; receive, based on the query, an artifact from the content repository; and displaying the artifact via an interface.

In some aspects, the techniques described herein relate to a system, wherein the artifact is indexed in the content repository by the predicted intent.

In some aspects, the techniques described herein relate to a system, wherein the artifact is a knowledge base article.

In some aspects, the techniques described herein relate to a system, wherein the at least one computer is configured to: receive a voice-based contact; and convert the voice-based contact into the text string using a speech-to-text engine.

In some aspects, the techniques described herein relate to a system, wherein the text string is received as a text-based contact.

In some aspects, the techniques described herein relate to a system, wherein the at least one computer is configured to: generate mapped utterance tokens, wherein the generating mapped utterance tokens includes mapping previously recorded utterance tokens to predefined intent category labels.

In some aspects, the techniques described herein relate to a system, wherein the at least one computer is configured to: train the machine learning model with the mapped utterance tokens.

In some aspects, the techniques described herein relate to a non-transitory computer readable storage medium, including instructions stored thereon, which instructions, when read and executed by one or more computer processors, cause the one or more computer processors to perform steps including: tokenizing a text string into utterance tokens; vectorizing the utterance tokens; providing the utterance tokens to a machine learning model as input to the machine learning model; receiving, as output from the machine learning model, a predicted intent; formatting a query of a content repository, wherein the query includes the predicted intent; receiving, based on the query, an artifact from the content repository; and displaying the artifact via an interface.

In some aspects, the techniques described herein relate to a non-transitory computer readable storage medium, wherein the artifact is indexed in the content repository by the predicted intent.

In some aspects, the techniques described herein relate to a non-transitory computer readable storage medium, wherein the artifact is a knowledge base article.

In some aspects, the techniques described herein relate to a non-transitory computer readable storage medium, including: receiving a voice-based contact; and converting the voice-based contact into the text string using a speech-to-text engine.

In some aspects, the techniques described herein relate to a non-transitory computer readable storage medium, wherein the text string is received as a text-based contact.

In some aspects, the techniques described herein relate to a non-transitory computer readable storage medium, including: generating mapped utterance tokens, wherein the generating mapped utterance tokens includes: mapping previously recorded utterance tokens to predefined intent category labels; and training the machine learning model with the mapped utterance tokens.

US 12,586,572 B2

3

FIG. 2 is a logical flow for intent prediction and usage, in accordance with aspects.

Figure 3:
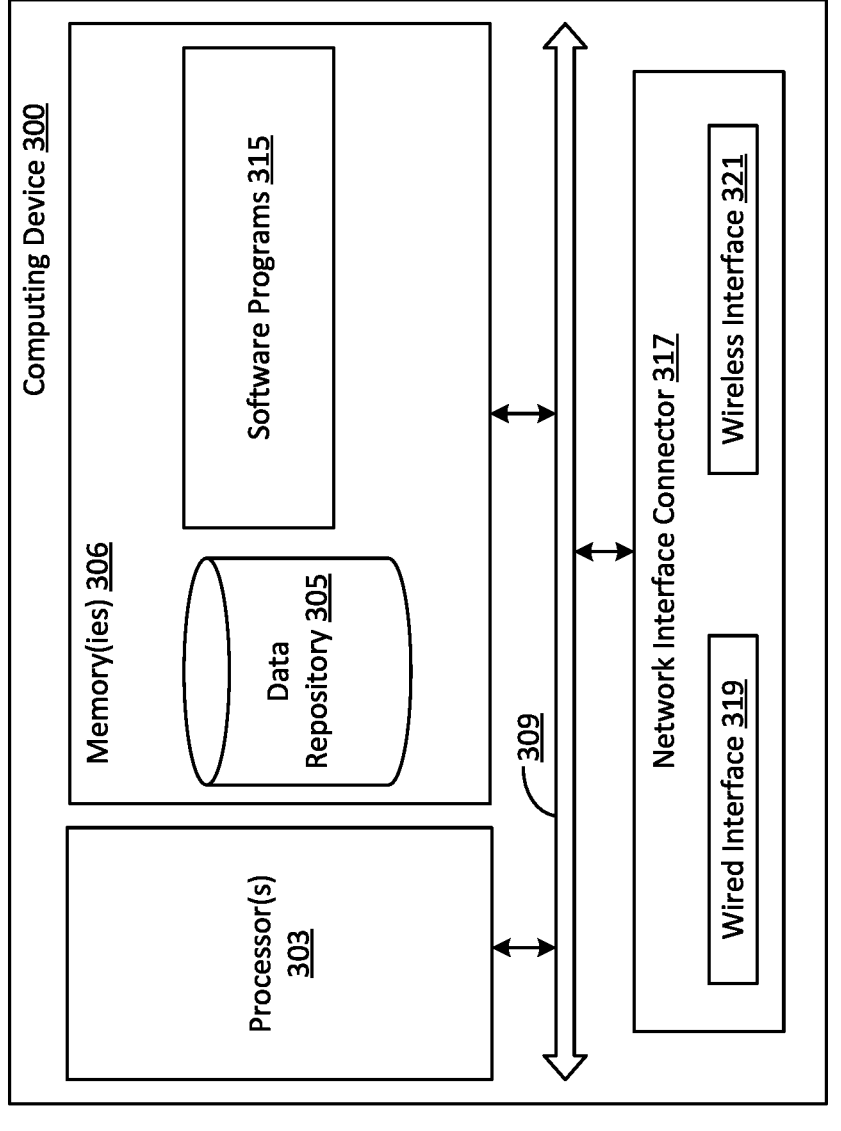

FIG. 3 is a block diagram of a computing device for implementing certain aspects of the present disclosure.

DETAILED DESCRIPTION

Aspects generally relate to systems and methods for intent prediction and usage.

In accordance with aspects, customer service specialists (also referred to as "support agents" or "agents" herein) may receive assistance from technological systems and methods during their interactions with customers. Systems and methods may determine customer intent from a conversation or other contact and use the intent with available customer data and other metadata to retrieve content from a content repository. The content may help a customer service specialist to address a customer's particular needs. Moreover, customer data may be used with determined intents and other available data to predict products, services, or other organizational offerings that a customer may be interested in.

In accordance with aspects, a transcription platform, including a speech-to-text engine, may transcribe audio of a conversation between an agent and a customer into a text utterance as the conversation happens. A trained machine learning (ML) model may receive the text utterance and categorize utterance tokens into customer intents. The determined intents may be used to select and display content such as knowledge base (KB) artifacts (e.g., how-to articles, FAQs, procedural instructions, etc.) from a repository to an agent.

Moreover, customer intents and/or information may be derived from other portions of a customer contact. For instance, the proposed system may display customer intents derived from an interactive voice response (IVR) system interaction of a customer before being routed to an agent. Customer account details may be displayed for, e.g., authenticated/verified customers when they are available. Digital interaction, e.g., instant messages or text messages sent to a text bot, or an agent, may also be processed with ML models to produce customer intents and useful information.

Pertinent customer information (e.g., organizational, and personal information of a customer), intents, and related KB artifacts may be displayed to an agent through an interface. An intent management platform may include a query engine for retrieving KB artifacts based on received intents and an interface (e.g., a web-based or other graphical interface) for displaying the KB artifacts, intents, etc., to an agent.

In accordance with aspects, a proposed system/method may use a transcription platform to generate text from speech signals of both a customer and an agent in a conversation. The transcription engine may include a service that takes streaming audio content as input and produces streaming text transcriptions as output. A conversation may be divided into sub-portions of recorded words called utterance tokens. The transcription engine may tokenize and vectorize utterances and may relay the vectorized utterance tokens to an intent classifier as input. An intent classifier may output inferred customer intents based on one or more utterance tokens received as input. Intent classifiers may be machine learning (ML) models trained with a training data set and a corresponding machine learning algorithm.

Aspects may include a suite of trained intent classifiers to determine customer intents from a customer interaction as they are spoken. A customer intent may identify one or more issues, complaints, questions, etc., that a customer seeks a resolution/answer to. Inferred intents and other conversational elements isolated and classified by a ML engine may be displayed to an agent through a user interface (e.g., a graphical user interface (GUI)).

Customer intents may also be used as lookup keys to query knowledge base (KB) artifacts from a repository and display the artifacts to an agent via an interface. As noted, above, KB artifacts may include institutional knowledge such as instructions and content on how to accomplish tasks related to customer inquiries, complaints, etc. For instance, a KB article for a payment product issuing organization may include instructions for submitting a report of a customer's lost/stolen payment card and for requesting a replacement card for the customer. A KB repository may be indexed by customer intent. All KB artifacts associated with a determined intent may be displayed to an agent during a customer contact. An artifact preview such as a title, abstract, etc., may also be displayed in a preview pane to an agent.

In some aspects, intent categories may be distilled into a set of labels that may be included in a training dataset that is used to train machine learning (ML) classification models. For instance, related intents may be categorized and given a label. Determined intents may be assigned to one or more labels, and the assignments may be used as input to a ML algorithm for fitting vectorized utterance tokens to a ML classifier/classification model.

Aspects may train intent classifier models on a training data set that includes previously recorded, transcribed, and labeled conversations that include customer intents and/or mappings to intent category labels. The training data may be input to a machine learning algorithm, and the ML algorithm may fit the data to a corresponding ML model. Exemplary models may include convolutional neural networks that include one input layer, one hidden layer, and one output (single node) layer. The input layer may receive, as input, vectorized utterance tokens, a vector of keyword indicators, and the output of, e.g., a "bidirectional encoder representations from transformers" (BERT) encoding model component that indicates key phrases within the utterance.

Aspects may first estimate customer intent at each speaker switch (turn) of the conversation. Aspects may further collect the finalized utterances recovered during each conversational turn, and the collated transcripts may be input to the intent classification model. A finalized utterance may be a segment of audio containing spoken words that the transcription engine is able to detect and transcribe into text. Aspects may first use, e.g., a Global Vectors for Word Representation (GloVe) algorithm to generate features of the text. The output of the algorithm is a vector of float values that represent the likelihood of the following term given the input terms. The vectors of term likelihoods from, e.g., a GloVe algorithm may serve as part of the input to the intent classifier. Keywords recovered from the terms in the conversation turn may be additional input features. The classifier output layer produces a vector of floating point output values that represent the classifier labels. Aspects may collect a number of scores, such as the top three intent scores, from the classifier model for each conversation turn and may output up to three intents to a user. In some aspects, a threshold value may be used to determine whether an intent is displayed to a user.

In accordance with aspects, system components, such as a transcription platform, speech-to-text engine, ML engine (including a ML classifier/classification model and corresponding algorithms), query engine, user interface, etc., may be provided as a set of microservices that are individually created and loosely coupled, such that the solution is scalable, robust to errors, observable, and highly available.

Figure 1:
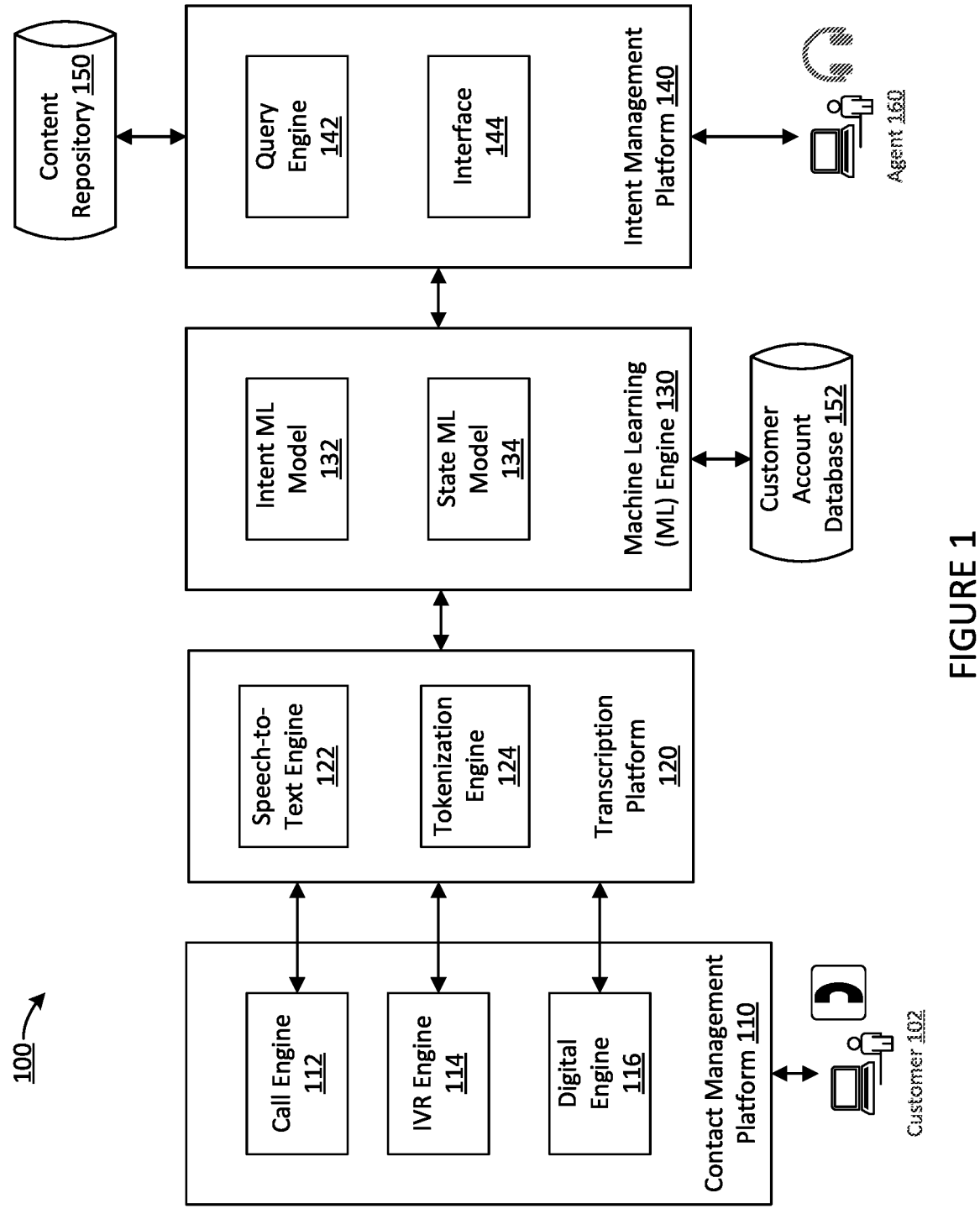
FIG. 1 is a block diagram of a system for intent prediction and usage, in accordance with aspects.

FIG. 1 is a block diagram of a system for intent prediction and usage, in accordance with aspects. System 100 includes contact management platform 110, transcription platform 120, machine learning engine (ML) engine 130, and intent management platform 140. System 100 also includes content repository 150 and customer account database 152.

Contact management platform 110 includes call engine 112, IVR engine 114, and digital engine 116, in accordance with aspects. A customer, such as customer 102, may initiate contact with contact management platform 110. The contact may be a voice-based contact such as a telephone call, video call, web-based call, etc., or it may be a text-based contact such as an instant message, SMS message, etc. Contact management platform 110 may include components for handling both voice-based and text-based contacts. For instance, call engine 112 may receive and process incoming voice-based contacts and digital engine 116 may receive and process incoming text-based contacts. In accordance with aspects, a contact may include more than one form of communication. For instance, a contact may start as a text-based contact and may progress to a voice-based contact. Additionally, a voice-based contact may be with an interactive voice response (IVR), a support agent, or both. That is, a voice-based contact may begin with an IVR and transition to contact with a support agent. IVR engine 114 may be responsible serving an IVR process and recording customer responses to the IVR process.

In accordance with aspects, contact management platform 110 may receive voice-based and text-based contacts and process the contacts according. For instance, call engine 112 may send a stream of uttered speech to transcription platform 120. IVR engine 114 may record responses to IVR prompts and send the response to transcription platform 120. Additionally, call engine 112 and/or IVR engine 114 may make and store recordings of voices contacts for training purposes (i.e., training of both agents and ML models). Moreover, digital engine 116 may receive strings of text and forward the text strings to transcription platform 120).

In accordance with aspects, transcription platform 120 may include speech-to-text engine 122 and tokenization engine 124. Transcription platform 120 may receive steams of spoken utterances from contact management platform 110 and may process the streams of spoken utterances with speech-to-text engine 122. Speech-to-text engine 122 may transcribe the spoken utterances to strings of text. Speech-to-text engine 122 may send strings of text to tokenization engine 124. Tokenization engine 124 may also receive strings of text (e.g., directly) from digital engine 116.

Tokenization engine 124 may divide a string of text into related sub-portions called utterance tokens. Utterance tokens may be split text strings based on white space, special characters, known phrases, parts of speech, etc. Tokenization engine 124 may also vectorize utterance tokens into feature vectors. A feature vector is a numerical feature generated from utterance tokens that may be processed as input to a ML model.

In accordance with aspects, vectorizing processes may produce, e.g., a count of individual words filtered by those most frequently occurring in the data, a count of sub-word character n-grams of, e.g., between 3 to 6 characters, and (in some aspects) regular expression (regex) patterns that may be supplied by data scientists for certain keywords, etc. Other vectorization processes may attempt to determine the semantic meaning of a word or an entire utterance in context. A vectorizing process may include model pretrained weights that may consider word casing and may further convert word strings into a real valued feature vector for each word or sub-word of an utterance token and a real valued feature vector for the entire utterance. Such feature vectors generated by a tokenization engine may be ingested by a ML model for processing/predictions. Counts and vectors generated by tokenization engine 124 may be passed to a model as input.

In accordance with aspects, vectorizing may occurs at each speaker switch in a transcription. The transcribed utterances during a speaker's turn in the conversation may be collected and concatenated. This may represent a transcribed turn of the conversation. Prior to vectorizing, stop words may be removed from the turn transcript. Stop words may be frequent terms that do not add to an interpretation of the intent. Exemplary stop words in a transcribed text may include, "the" or "an". Additionally, in transcribed conversation, "um" or "uh" may be a common stop word. Term stemming may then be applied to reduce vocabulary cardinality. Term stemming may include removing suffixes and prefixes that do not contribute to semantic content. The output of vectorization may be a representation (embedding) of terms and term relationships to other terms in the word stream. The vector space representation may include the input to the intent categorization method.

Exemplary embedding schemes for text may include GloVe, TF-IDF, ELMo, and LSTM each of which may generate vectorized representations. Aspects may select the best embedding scheme for a specific corpus and intent classification task. Using training data e.g., (conversation elements with labeled intents), aspects may generate embedding representations of each embedding scheme for each training data instance (conversation element). Then for each embedding, the centroid representation of each intent may be found. A selected embedding may be the generated embedding with the maximal distance between intent centroids (e.g., L2-norm).

In accordance with aspects, feature vectors generated by transcription platform 120 may be sent to ML engine 130 for processing with one or more ML models. Feature vectors may be used as input to intent ML model 132. Intent ML model 132 may be a classification model that takes a feature vector generated from an utterance token as input and provides a prediction of an intent classification as output. Although intent ML model 132 is depicted as a single model, it is contemplated that transcription platform 120 may include a suite of intent classification models to determine customer intents from a customer interaction as they are spoken.

In accordance with aspects, an intent classification model may be a convolutional neural network (CNN) model. Input to a CNN model may include the embedding representation of a conversational element combined with additional keyword indicators that are relevant to the target intents detection. The input layer size may be the size of the embedding representation plus the keyword indicators. The input layer may be fully connected to the initial hidden layers with dropout regularization. The hidden convolutional layers (e.g., 6 hidden layers) may be 512, 256, 256, 256, 256, and 512 in size respectively. Kernel (i.e., filter) sizes of the CNN may decrease through the hidden layers (for instance, 10, 5, 4, 3, 2, and 1 respectively). The intuition for kernel sizes may be that adjacent features are relevant to the activation of a particular feature and by gradually decreasing kernel sizes, feature activation can be focused to the closest features. The output layer size may be the number of intents to classify. The hidden layers may use dropout regularization to prune connections between hidden layers as well as hidden to output layers. The output intent category for the input element may correspond to the output node with a maximal value. Aspects may search in the convolutional network parameters (e.g., numbers of hidden layers (depth of convolution), layer sizes, kernel sizes) to find the best network for the intent categorization task using the training data.

Intent ML model 132 may be configured to output a predicted intent for one or more feature vector inputs. For instance, based on one or more feature vectors generated from a stream of audio from a voice-based contact with respect to a customer's payment card product being lost, intent ML model 132 may output an intent of "lost/stolen payment card." In another example, intent ML model 132 may output an intent of "online bill-pay process" for a customer that has made contact and inquired about how to pay a bill through on organization's bill pay service.

Intents output from intent ML model 132 may be sent to intent management platform 140. Intent management platform 140 may include query engine 142 and interface 144. Intent management platform 140 may receive intents from ML engine 130 and query engine 142 may use the intents as a lookup parameter to retrieve content from content repository 150. Content repository 150 may be any suitable data store for storing content that may be displayed by interface 144. For instance, content repository 150 may be a relational database, a NoSQL database, a key-value pair datastore, etc.

Content repository 150 may store KB artifacts. KB artifacts stored in content repository 150 may be indexed by intents. That is, content repository 150 may be indexed by intents that are output by intent ML model 132. Query engine 142 may receive an intent from ML engine 130 and format a query using the received intent as a lookup parameter. The query may retrieve all KB artifacts from content repository 150 that are associated with the intent used as the lookup parameter.

In accordance with aspects, intent management platform 140 may display all retrieved KB artifacts from content repository 150 to agent 160 via interface 144. Interface 144 may be any suitable interface, such as a web interface, an application interface, or some other type of graphical, textual, or commend-line interface. Interface 144 may further be configured to display other helpful information to support agent 160 in real time (i.e., as agent 160 is engaging customer 102 on a voice-based or text-based contact). For instance, various intents may be displayed. Raw intents may help agent 160 clarify if the system has determined the correct intent. Moreover, certain intents may classify a customer's various emotions at the outset of a contact and may reclassify emotions as they change throughout the course of a contact (e.g., an initial displayed intent may be disappointment and/or frustration, and as a contact proceeds, a freshly determined intent may indicate appreciation).

In some aspects, interface 144 may display a transcript of a conversation as it happens. This may help agent 160 more clearly understand what is being spoken and may allow agent 160 to read the transcript rather than ask customers to repeat themselves.

In accordance with aspects, intents may be distilled into a set of labels that may be included in a training dataset that is used to train ML classifier models. For instance, related intents may be categorized and given a label. Determined intents may be assigned to one or more labels, and the assignments may be used as input to a ML algorithm for fitting data to a ML classification model.

With continued reference to FIG. 1, ML engine 130 may also include state ML model 134. State ML model 134 may be a machine learning model trained to output suggestions of products and/or services based on a state of a customer (e.g., customer 102) that has initiated a contact. State ML learning model may use customer data from customer account database 152 and/or intent data from intent ML model 132 in order to determine a "state" of a customer. A customer's state may indicate one or more suggestions that an agent may make to a customer. For instance, customer account database 152 may include various data associated with a customer that has been collected from, e.g., an organization's various systems of record.

For instance, using a financial institution as an exemplary organization, customer account database 152 may include a customer's organizational information such as a customer's account information, a customer's credit score, etc., and a customer's personal information such as home ownership, relationship status, parental status, etc. Any customer information that is accessible and that may be necessary or helpful during a customer contact may be collected from customer account database 152. While customer account database 152 is depicted as a single datastore, it is contemplated that customer account database 152 may be a single, or several separate, datastores that store various organizational and personal information of an organization's customers. Customer account database 152 may be any suitable datastore.

State ML model 134 may take customer data from customer account database 152 and (in some aspects) one or more determined intents from intent ML model 132, as input (i.e., as a customer's "state") and may output a product and/or service suggestion for, e.g., customer 102. The customer suggestions may be based on the customer's state as indicated by collected organizational and personal information of the customer. For instance, content repository 150 may store customer suggestions indexed by customer states. State ML model 134 may predict and send one or more customer suggestions, which may include offers or service suggestions that the customer is eligible for or may benefit from to intent management platform 140. The customer suggestions may be displayed to the agent via interface 144, and the agent may proceed to discuss the displayed suggestions with the customer during a contact.

In accordance with aspects, an exemplary use case for the present systems and methods may be in the context of a financial organization serving its customers. In aspects, a customer contact may begin with a customer of an organization contacting the organization's contact management center. The contact management center may have backend technology (e.g., as described above) configured as a contact management platform and may receive either voice-based or text-based contacts from the customer. A voice-based contact may be a telephone call, video call, etc. A text-based contact may be, e.g., via an instant message application of a digital engine.

If a contact is voice-based a customer may first speak to an IVR engine. If text-based, a customer may converse with a chat bot via a digital engine. An IVR and/or chat bot (referred to collectively herein as an automated assistant) may be configured to collect customer verifying information and an initial contact reason from the customer. Customer verifying information may include a customer name, a customer's account number (or a part thereof), or other information that may identify authenticate and/or verify the customer. In some aspects, an out-of-band 2-factor authentication/verification method may be used to identify and verify the customer, where the customer is sent a secret message via an out-of-band channel (i.e., an email, SMS message, etc.). The customer may then respond with the secret message to the IVR or chat bot, thereby verifying the customer's identity.

After customer authentication and/or verification, an automated assistant may collect more sensitive organizational information associated with the verified customer. For instance, an automated assistant may collect organizational information such as accounts the customer has with the organization, account balances, etc. Moreover, an automated assistant may collect personal information of the customer that the organization has on file. Accounts may include checking accounts, saving accounts, payment product (e.g., credit card) accounts, mortgage accounts, auto loan accounts, investments accounts, etc. Personal information may include personally identifiable information such as the customer's name, address, telephone number, income, marital status, parental status, etc.

Automated assistants may collect any necessary or useful information that the organization has about the contacting customer. This information may be used to inform a service agent more fully about the customer. The automated assistant, or other components of a contact management platform, may send the collected organizational and/or personal information to an intent management platform for display to a service agent via an interface. The collected information may also be provided as input to a ML model that may predict additional services that the customer may benefit from. In some aspects, some of the organizational information and personal information may be included as input to a ML model that predicts customer intents.

After the automated assistant has collected the customer's organizational and personal information, the automated assistant may attempt to identify a customer's contact reason. The customer's contact reason may be the principal reason prompting the customer's contact with the organization. The contact reason may be a question, issue, complaint, etc., associated with an organizational product or service that the customer has. In response to a query for the customer's contact reason, the customer may say or type, a natural language utterance. This utterance may be collected and processed by a machine learning engine in order to infer an intent from the customer's utterance including the contact reason.

In accordance with aspects, once an initial intent has been inferred, the customer's collected organizational information and initial intent may be relayed to an intent management platform and displayed to an agent via an interface. At this point, the contact may also be transferred to the agent. Accordingly, the agent may now view the customer's organizational and personal information and an initial intent. Additionally, the agent may be in direct contact with the customer, via either text or voice. At this point, the conversation may continue, and may be streamed to a transcription platform. This streaming may include voice-based or text-based input form both the customer and the agent. In the case of a voice-based conversation, the transcription platform may convert received audio to text. Text from a speech to text engine or directly from a text-based conversation may be tokenized and vectorized.

In accordance with aspects, a customer's utterance may include, "I have lost my credit card." A tokenization engine may split the utterance into several utterance tokens, including "lost' and "credit card." These tokens may be vectorized and streamed to a ML engine for processing with an intent model. The ML engine may receive the vectorized tokens and may process them with an intent model, which may infer/predict that the customer has lost their payment product. Output from the intent model may include the intent "lost payment product." The output intent may be sent to an intent management platform. The intent management platform may query a content repository using the intent as a lookup parameter and retrieve related content, such as KB artifacts. Content in the content repository may be indexed by intent. Returned content may be displayed for an agent's use via an interface.

In accordance with aspects, additionally displayed to an agent may be product and/or service suggestions for the contacting customer. The product/service suggestions may be based on organizational and/or personal information associated with the customer. The organizational and/or personal information may represent a "state" of the customer and may be used as input to a state ML model. The model may output suggestions based on the "state" of the customer received as input. The suggestions may be predicted by the model to be beneficial to the customer based on the customer's state. These suggestions may be displayed to an agent, who may make the suggestions at an appropriate time during the customer contact.

FIG. 2 is a logical flow for intent prediction and usage, in accordance with aspects.

Step 210 includes tokenizing a text string into utterance tokens.

Step 220 includes vectorizing the utterance tokens.

Step 230 includes providing the utterance tokens to a machine learning model as input to the machine learning model.

Step 240 includes receiving, as output from the machine learning model, a predicted intent.

Step 250 includes formatting a query of a content repository, wherein the query includes the predicted intent.

Step 260 includes receiving, based on the query, an artifact from the content repository.

Step 270 includes displaying the artifact via an interface.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as a call engine, an IVR engine, a digital engine, a speech-to-text engine, a tokenization engine, a machine learning engine, an interface, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a general-purpose computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method for intent prediction and usage comprising:
   receiving a voice-based contact;
   converting the voice-based contact into a text string using a speech- to-text engine;
   tokenizing the text string into utterance tokens by splitting the text string based on white space, special characters, and one or more of known phrases and parts of speech;
   vectorizing the utterance tokens into feature vectors;
   providing the utterance tokens and feature vectors to a machine learning model as an input layer to the machine learning model, wherein the machine learning model is a convolutional neural network ("CNN") comprising the input layer, a hidden layer, and an output layer with a size of number of intents to classify;
   receiving, as output from the machine learning model, a predicted intent;
   formatting a query of a content repository, wherein the query includes the predicted intent;
   receiving, based on the query, an artifact from the content repository, wherein the artifact is a knowledge base article indexed in the content repository by the predicted intent; and
   displaying the artifact via an interface to a support agent.

2. The method of claim 1, comprising:
   generating mapped utterance tokens, wherein the generating mapped utterance tokens includes:
   mapping previously recorded utterance tokens to predefined intent category labels.

3. The method of claim 2, comprising:
   training the machine learning model with the mapped utterance tokens.

4. A system comprising at least one computer including a processor, wherein the at least one computer is configured to:
   receive a voice-based contact;

convert the voice-based contact into a text string using a speech-to-text engine;

tokenize the text string into utterance tokens based on white space, special characters, and one or more of known phrases and parts of speech;

vectorize the utterance tokens into feature vectors;

provide the utterance tokens and feature vectors to a machine learning model as an input layer to the machine learning model, wherein the machine learning model is a convolutional neural network ("CNN") comprising the input layer, a hidden layer, and an output layer with a size of number of intents to classify;

receive, as output from the machine learning model, a predicted intent;

format a query of a content repository, wherein the query includes the predicted intent;

receive, based on the query, an artifact from the content repository, wherein the artifact is indexed in the content repository by the predicted intent; and displaying the artifact via an interface to a support agent.

5. The system of claim 4, wherein the at least one computer is configured to:

generate mapped utterance tokens, wherein the generating mapped utterance tokens includes mapping previously recorded utterance tokens to predefined intent category labels.

6. The system of claim 5, wherein the at least one computer is configured to:

train the machine learning model with the mapped utterance tokens.

7. A non-transitory computer readable storage medium, including instructions stored thereon, which instructions, when read and executed by one or more computer processors, cause the one or more computer processors to perform steps comprising:

receiving a voice-based contact;

converting the voice-based contact into a text string using a speech-to-text engine;

tokenizing the text string into utterance tokens based on white space, special characters, and one or more of known phrases and parts of speech;

vectorizing the utterance tokens into feature vectors;

providing the utterance tokens and feature vectors to a machine learning model as an input layer to the machine learning model, wherein the machine learning model is a convolutional neural network ("CNN") comprising the input layer, a hidden layer, and an output layer with a size of number of intents to classify;

receiving, as output from the machine learning model, a predicted intent;

formatting a query of a content repository, wherein the query includes the predicted intent;

receiving, based on the query, an artifact from the content repository, wherein the artifact is indexed in the content repository by the predicted intent; and displaying the artifact via an interface to a support agent.

8. The non-transitory computer readable storage medium of claim 7, comprising:

generating mapped utterance tokens, wherein the generating mapped utterance tokens includes:

mapping previously recorded utterance tokens to predefined intent category labels; and training the machine learning model with the mapped utterance tokens.

* * * * *